(12) United States Patent
Sobiski et al.

(10) Patent No.: US 6,498,886 B1
(45) Date of Patent: Dec. 24, 2002

(54) ADAPTIVE FEEDBACK CONTROL METHOD FOR POLARIZATION MODE DISPERSION OR CHROMATIC DISPERSION COMPENSATION

(75) Inventors: Donald J. Sobiski, Horseheads, NY (US); Matthew S. Whiting, Lawrenceville, PA (US)

(73) Assignee: Corning, Incorporated, Corning, NY (US)

(*) Notice: Subject to any disclaimer, the term of this patent is extended or adjusted under 35 U.S.C. 154(b) by 0 days.

(21) Appl. No.: 09/784,329

(22) Filed: Feb. 16, 2001

Related U.S. Application Data

(63) Continuation-in-part of application No. 09/589,423, filed on Jun. 7, 2000.
(60) Provisional application No. 60/185,158, filed on Feb. 18, 2000.

(51) Int. Cl.[7] ............................. G02B 6/00; H04B 10/18
(52) U.S. Cl. ..................... 385/122; 385/11; 359/161; 359/153
(58) Field of Search ................. 385/11, 122, 31; 359/152–154, 161

(56) References Cited

U.S. PATENT DOCUMENTS

| 5,608,562 A | 3/1997 | Delavaux et al. ........... 359/161 |
| 5,999,289 A | * 12/1999 | Ihara et al. ................. 359/124 |
| 6,320,687 B1 | * 11/2001 | Ishikawa .................... 359/161 |

FOREIGN PATENT DOCUMENTS

| EP | 0812075 A2 | 12/1997 |
| EP | 0862078 A1 | 9/1998 |
| EP | 0902560 A2 | 3/1999 |
| EP | 0912001 A2 | 4/1999 |
| EP | 0971493 A2 | 1/2000 |

OTHER PUBLICATIONS

T. Takahashi et al., "Automatic compensation technique for timewise fluctuating polarisation mode dispersion in in–line amplifier systems," Electronics Letters, Feb. 17th, 1994, vol. 30, No. 4, pp. 348–349.

D. Sandel et al., "Automatic polarisation mode dispersion compensation in 40 Gbit/s optical transmission system," Electronic Letters, Nov. 12th, 1998, vol. 34, No. 23, pp. 2258–2259.

Reinhold Noe et al., "Polarization Mode Dispersion Compensation at 10, 20, and 40 Gb/s with Various Optical Equalizers," Journal of Lightwave Technology, Vo. 17, No. 9, Sep. 1999, pp. 1602–1616.

* cited by examiner

Primary Examiner—Rodney Bovernick
Assistant Examiner—Juliana K. Kang
(74) Attorney, Agent, or Firm—Volentine Francos, PLLC (57) ABSTRACT

A method for controlling a dispersion compensation in optical communications is disclosed. The illustrative method includes receiving a first measurement of dispersion at a first step; receiving a second measurement of dispersion at a second step; calculating a gradient of dispersion between the first measurement of dispersion and the second measurement of dispersion; and sending a command to a dispersion compensator based on the value of the gradient.

11 Claims, 4 Drawing Sheets

Closed Loop Feedback Controller Architecture

FIG. 1
Closed Loop Feedback Controller Architecture

FIG. 5
Combined PMD and CD Compensation

ADAPTIVE FEEDBACK CONTROL METHOD FOR POLARIZATION MODE DISPERSION OR CHROMATIC DISPERSION COMPENSATION

CROSS-REFERENCE TO RELATED APPLICATIONS

The present invention is a continuation-in-part of U.S. patent application Ser. No. 09/589,423, entitled "All Fiber Polarization Mode Dispersion Compensator", filed Jun. 7, 2000 and assigned to the assignee of the present invention. The disclosure of this parent application is specifically incorporated by reference herein. The present invention also claims priority from U.S. Provisional Application No. 60/185,158, entitled "Electrical Detector for Adaptive Control of Chromatic Dispersion in Optical Systems", filed Feb. 18, 2000, the disclosure of which is specifically incorporated by reference herein. The present application is related to U.S. patent application Ser. No. 09/785,642 entitled "System and Method For Measurement of the State of Polarization Over Wavelength," filed on even date herewith, and specifically incorporated by reference herein.

FIELD OF THE INVENTION

The present invention relates generally to optical communication systems, and particularly to a method for controlling dispersion compensation in optical communication systems.

BACKGROUND OF THE INVENTION

Optical transmission systems, including optical fiber communication systems, have become an attractive vehicle for carrying voice and data at high speeds. However, conventional high-speed optical communications systems are prone to increased bit error rates (BER) as the bandwidth of the individual channels in the optical communications system is increased. Two such sources of this increase in error are polarization mode dispersion (PMD) and chromatic dispersion (CD). Polarization mode dispersion is a fundamental property of single mode optical fiber and components in which signal energy at a given wavelength is resolved into two orthogonal polarizations states of slightly different propagation velocity. The resulting difference in the propagation time between the polarization states is called the differential group delay (DGD), commonly symbolized $\Delta\tau_g$. Chromatic dispersion (CD) results from the fact that in transmission media, such as glass optical fibers, the higher the frequency of the optical signal, the greater the refractive index. As such, higher frequency components of an optical signal will "slow down," and contrastingly, lower frequency components will "speed up." Both polarization mode dispersion and chromatic dispersion may result from the ambient environment of the optical communication system. To this end, factors such as temperature, mechanical stress or strain, and impurities in the material may result in PMD and CD in the optical communication system.

In digital optical communication systems, where the optical signal is ideally a square wave, PMD and CD may cause optical pulse spreading, or pulse deformation in general. The spreading of the digital pulse in time may cause it to overflow into the time slot that has been allotted to another bit. Ultimately, the individual bits are difficult to distinguish, and inter-symbol interference (ISI) may occur. ISI may result in an increase in the BER to unacceptable levels. In order to prevent the potential problems associated with ISI, it is necessary to compensate for both CD and PMD. Moreover, in order to properly carry out the compensation for chromatic dispersion and/or polarization mode dispersion, a suitable controller for the CD compensator and/or PMD compensator is useful. Finally, in order to effectively control ISI, it is of course advantageous to compensate for both PMD and CD in the optical communication system.

Generally, compensators are specific for the type of dispersion for which compensation is being implemented. To this end, compensators that are able to compensate for the affects of polarization mode dispersion are ineffective at compensating for the affects of chromatic dispersion, and vice versa. In addition, compensation is normally carried out in a closed feedback loop, with a controller commanding the compensator(s). Conventional compensators implement a control technique in which the controller commands a compensator action that is proportional to a magnitude of the dispersion in the system as measured by the detector. Fundamentally, this type of compensation scheme is limited; this type of method is generally only accurate when the dispersion measured by the detector is proportional to the type of dispersion (PMD or CD) for which a particular compensator is effective.

In practical systems, both chromatic are polarization mode dispersion are present to some measurable degree, and most detectors cannot accurately distinguish between them. As a result, if one particular type of dispersion has been appropriately compensated by its respective compensator, there may still be dispersion in the system resulting from the other source of dispersion. This dispersion is detected by the detector and an error signal is sent to the controller. Because the command from the controller to the dispersion compensator is based on the magnitude of the dispersion, and the detector cannot distinguish the sources of dispersion, the controller will issue a control signal to the compensator to attempt to compensate for the detected dispersion. However, this particular compensator is incapable of nullifying the dispersion from the (other) dispersion source, and ultimately the dispersion compensator will introduce further dispersion into the signal. As a result of this fundamental limitation of conventional compensation schemes, the compensator may over-correct, and actually exacerbate the dispersion problem in the system. To wit, as the particular compensator attempts to correct for the dispersion caused by the other source of dispersion, the total dispersion in the system increases, and the control loop will enter into a runaway or oscillatory mode, which is undesirable and potentially unstable.

Accordingly, what is needed is a technique for reducing the ill effect of various types of dispersion, which overcomes the limitations of the conventional techniques described above.

SUMMARY OF THE INVENTION

It is therefore an object of the present invention to provide a method for controlling dispersion compensation in an optical system in a manner that decouples the control of the compensator from the bias introduced by the addition of other independent source(s) of dispersion.

In order to achieve the above and other objectives, a method for controlling a dispersion compensation comprises receiving a first measurement of dispersion at a first step; receiving a second measurement of dispersion at a second step; calculating a gradient of dispersion between the first measurement of dispersion and the second measurement of dispersion; and sending a command to a dispersion compensator based on the value of the gradient.

BRIEF DESCRIPTION OF THE DRAWINGS

The invention is best understood from the following detailed description when read with the accompanying drawing figures. It is emphasized that the various features are not necessarily drawn to scale. In fact, the dimensions of the various features may be arbitrarily increased or decreased for clarity of discussion.

DETAILED DESCRIPTION

In the following detailed description, for purposes of explanation and not limitation, exemplary embodiments disclosing specific details are set forth in order to provide a thorough understanding of the present invention. However, it will be apparent to one of ordinary skill in the art that the present invention may be practiced in other embodiments that depart from these specific details. In other instances, detailed descriptions of well-known devices and methods are omitted so as to not obscure the description of the present invention.

Figure 1:
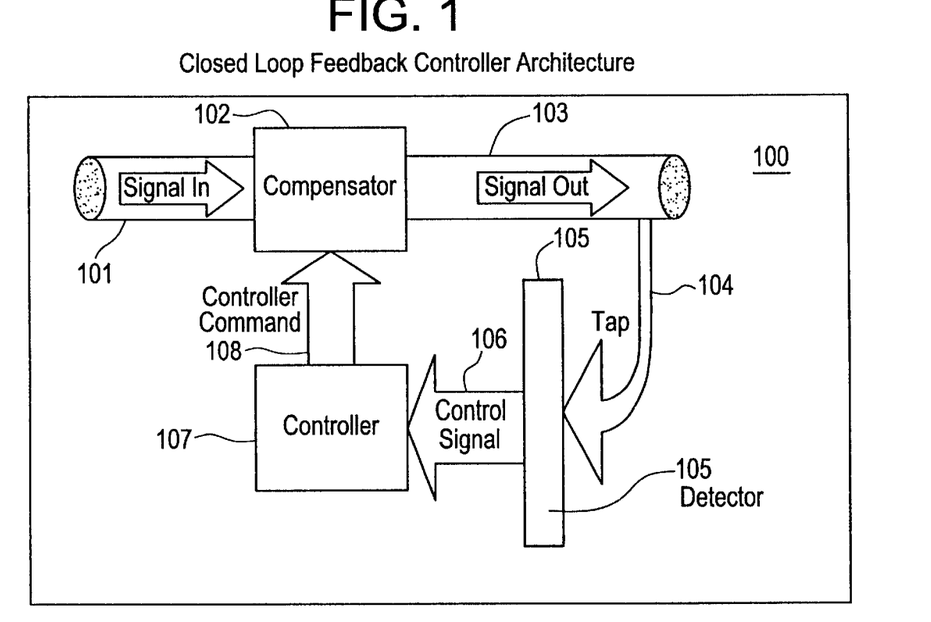
FIG. 1 is a schematic (block diagram) representation of a closed-loop feedback controller architecture according to an exemplary embodiment of the present invention.

Turning to FIG. 1, an illustrative closed-loop feedback controller architecture 100 that may incorporate an adaptive feedback control method according to the present invention is shown. A signal in 101 is from an optical communication system (not shown) and is illustratively carried over an optical waveguide, for example an optical fiber (not shown). The signal in 101 is input to a dispersion compensator 102, and a signal out 103 emerges from the dispersion compensator 102. A sample of the signal out 103 is branched off via a conventional tap 104, and is input to a detector. The detector 105 converts the optical signal from the tap 104 into an electrical signal, and provides a measure of the dispersion present in the signal out 103. The output of the detector 105 is an error signal 106, which is input to controller 107. The controller 107 introduces a controller command 108 to the dispersion compensator 102 based upon error signal 106. The controller command 108 instructs the dispersion compensator 102 as to the degree of "corrective dispersion" that should be added to the signal in 101. Briefly, the invention of the present disclosure is drawn to a method for determining the appropriate controller command 108 to be input to the dispersion compensator 102. It is of interest to note that the present invention may be useful in effecting dispersion compensation for a variety of types of dispersion. For purposes of illustration, the controller 107 may issue controller commands 108 to compensate for PMD and/or CD present in the optical system.

Figure 2:
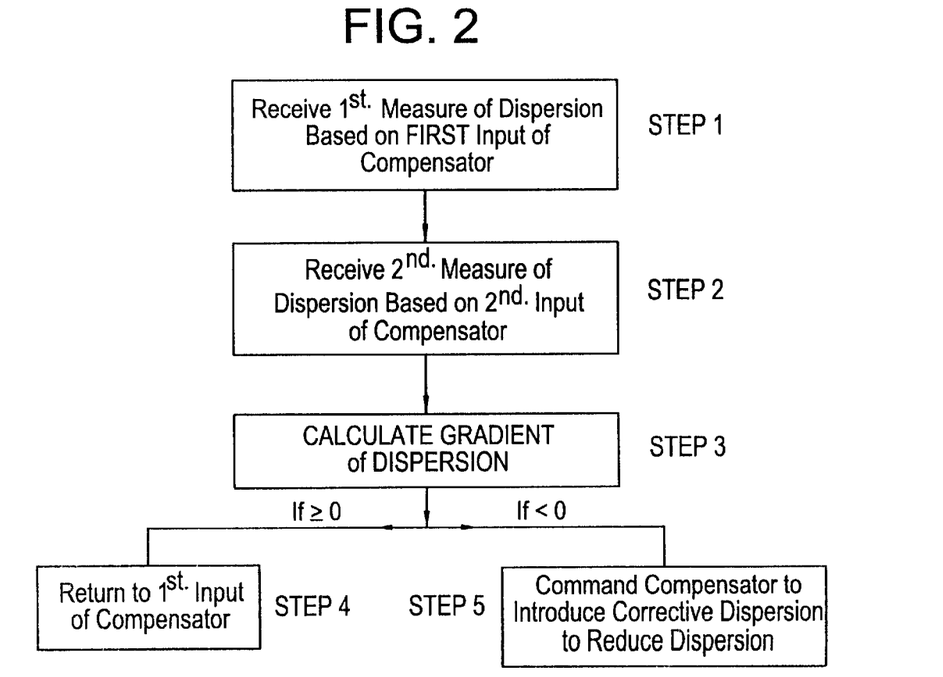
FIG. 2 is a flowchart of a method for controlling a dispersion compensator according to an exemplary embodiment of the present invention.

Turning to FIG. 2 a flowchart of an illustrative method for controlling dispersion is shown. In a deployed system, the dispersion compensator 102 introduces a certain degree of compensating or corrective dispersion into the signal in 101. According to Step 1 of FIG. 2, a first measurement of dispersion based on the first input of the dispersion compensator 102 is received by the controller 107 from the detector 105. In the illustrative embodiment of FIGS. 1 and 2, the measurement of dispersion (magnitude) is in the form of the error signal 106 received by the controller 107 from the detector 105. At a particular time after receiving the first measurement of dispersion (Step 1), a second measurement of dispersion is received (Step 2) by the controller 107 from the detector 105 (again, in the form of the error signal 106). Between Step 1 and Step 2 of FIG. 2, the amount of compensating or corrective dispersion being input to the signal in 101 by the dispersion compensator 102 may have been changed. Next, as shown at Step 3 of FIG. 2, the gradient of the dispersion between the received first measurement of dispersion (Step 1) and the received second measure of dispersion (Step 2) is calculated. Particularly, the gradient of the error signal 106 (i.e., the time rate of change of the output of the detector 106) is calculated.

Based upon the gradient of the dispersion, an accurate determination of the any needed dispersion compensation may be made. To this end, according to the illustrative method of the present invention as set forth in FIG. 2, the gradient of the dispersion, and not its magnitude, is used to determine the appropriate controller command. As such, if the gradient of the dispersion is zero, even though the magnitude of the dispersion is non-zero, no further compensatory dispersion is introduced into the optical communication system (Step 4 of FIG. 2). This is one clear advantage of the present invention compared to the conventional methods to effect dispersion compensation. In conventional methods, the presence of a non-zero dispersion level may result in the compensator's introducing "corrective" compensation when in fact the dispersion is of a type for which the particular compensator cannot compensate. As described above, this added compensation based on the magnitude of the dispersion can result in an increase in dispersion and ultimately in a runaway situation.

In contrast, according to an exemplary embodiment of the present invention, the gradient is used as the controller determinant. If the gradient is zero, the controller recognizes that all the dispersion that the current compensator can affect has been removed, and any remaining dispersion in the system is due to another source of dispersion. Likewise, if the amount of compensation is changed between Steps 1 and 2 of FIGS. 1 and 2, and the gradient is greater than zero, it may be that the compensator is only adding its type of dispersion to the system. As such, if the gradient is greater than or equal to zero, the compensator should return to its level of compensation of (Step 4). The controller 107 would issue a controller command 108 to the dispersion compensator 102 to return to its level of compensation of Step 1.

If, however, the gradient of the dispersion is less than zero, the controller command 108 instructs the dispersion compensator 102 to introduce corrective dispersion to further reduce the dispersion in the input signal 101. To this end, if the amount of compensation is changed between Steps 1 and 2, and this change results in a reduction in dispersion, then the compensator may be effective at reducing the dispersion (i.e. the type of dispersion for which the particular compensator can correct) and further compensation can be added.

Turning to FIGS. 3 and 4(a)–4(d), another exemplary embodiment according to the present invention is described. As with the embodiment described relative to FIG. 2, the exemplary embodiment described in FIGS. 3 overcomes the limitations of control methods in which the controller commands a compensator action that is directly related to the magnitude of the dispersion. As described previously, this may result in over correction and runaway. Rather, in the exemplary method of FIG. 3 used in an architecture such as that of FIG. 1, the controller command(s) 108 will be sent to a particular dispersion compensator 102 will be proportional to the gradient of the dispersion, which is the time rate of change of the detector output (error signal 106). Using the gradient as the basis for the controller command 108 to the dispersion compensator 102 decouples the controller command 108 from the bias introduced by the addition of other, independent source(s) of dispersion. Because the error signal 106 changes in a monotonic fashion with the changes in the dispersion in the system, the gradient can be reliably computed as an indication of the direction of change of the amount of dispersion in the signal.

Figure 3:
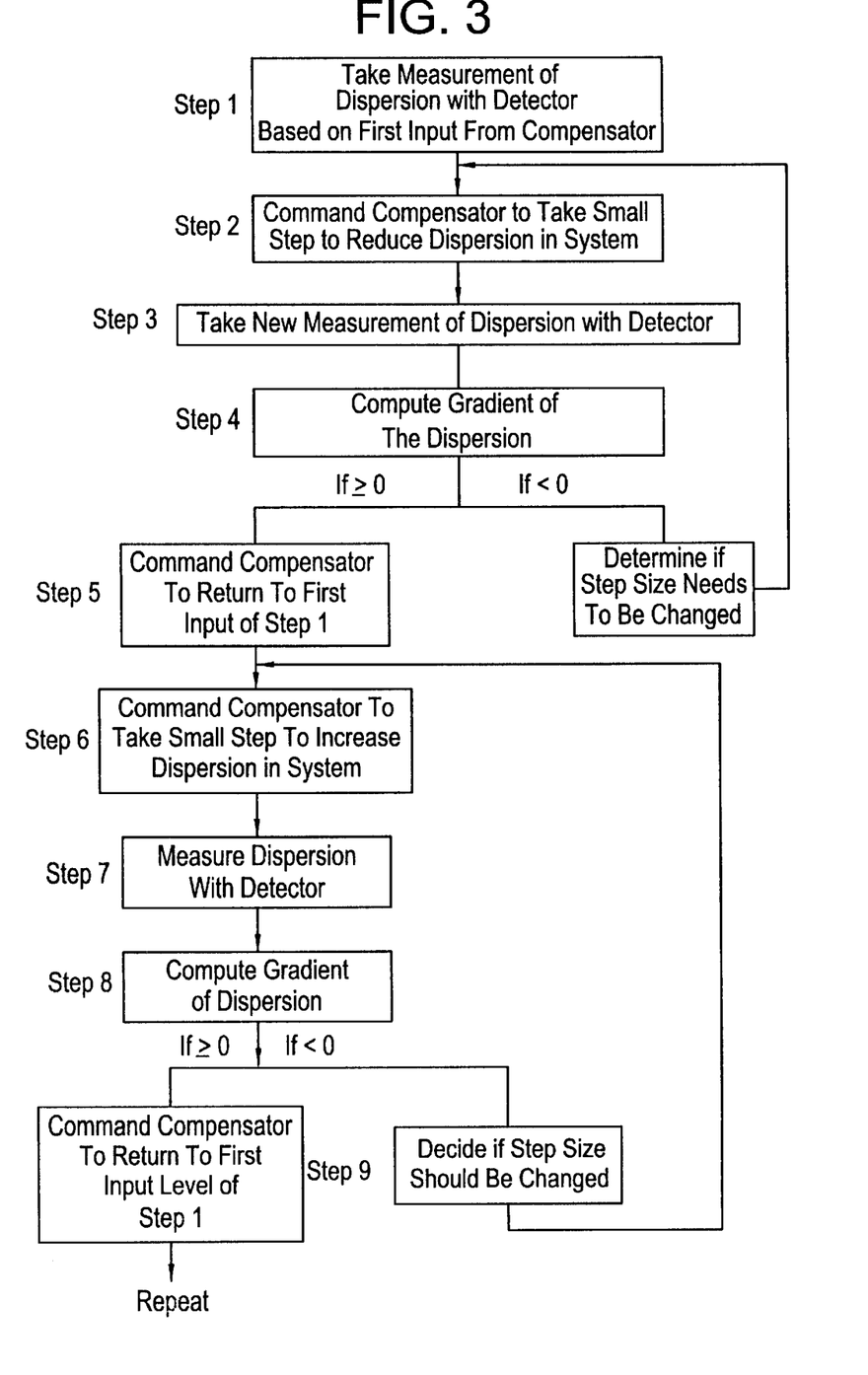
FIG. 3 is a flowchart of a method for controlling a dispersion compensator according to an exemplary embodiment of the present invention.

According to Step 1 in FIG. 3, a measurement of dispersion is taken by the detector 105, based on a first input from the dispersion compensator 102. Next, as described in Step 2, the compensator is commanded by the controller to take a small step to reduce dispersion in a system. The dispersion will be reduced if the amount of compensation can be increased, and various types of compensation methods are possible. Illustratively, PMD compensation is introduced by the dispersion compensator 102. One method of providing for PMD compensation relies on aligning the Principle States of Polarization (PSP) of the signal 101 with the corresponding Principle States of Polarization of a compensation device (e.g. dispersion compensator 102). This alignment can be achieved with the use of a polarization transformer. The amount of compensation achieved will correspond to the correctness of the alignment of the PSP's of the signal in 101 with those of the dispersion compensator 102. The controller will command the polarization transformer to make a small change in the alignment of the input PSP's with respect to that of the dispersion compensator 102, and measure the affect that this change has on dispersion. The dispersion will either decrease as better alignment is achieved, or increase if the alignment becomes less correct. In this manner, the controller 107 constantly seeks a best alignment, because the PSP's of the optical input signal are constantly changing. Further details of techniques for effecting PMD compensation may be found in the above referenced patent applications entitled "An Fiber Polarization Mode Dispersion Comensator" and "PMD Compensator."

In Step 3, a new measurement of dispersion is taken with the detector, and in Step 4 the gradient of the dispersion is computed. A general equation to approximate the gradient is at time $t_k$, given a sequence of n+1 measurements of dispersion $f(t_j)$: taken at the times $t_j<=t_k$ is to evaluate the following equation:

$$\text{gradient}(t_k) = \sum_{j=0}^{n} f(t_j) L'_j(t_j) \quad (1)$$

where $L'_j(t_j)$ is the partial derivative with respect to time of the $j^{th}$ order Lagrange polynomial. Moreover, the Lagrange polynomial can be computed with the following equation:

$$L_j(t_j) = \prod_{\substack{i=0 \\ i \ne j}}^{n} \frac{(t - t_i)}{(t_j - t_i)} \quad (2)$$

The error in the gradient computation will remain bounded for all time. This computation may be effected by the controller 107, which may include a microprocessor inclusive of a look-up table, for example.

If the gradient is greater than or equal to zero, Step 5 is initiated. According to Step 5, the dispersion compensator 102 is then commanded to return to its first input level, the input level of Step 1. Specifically, if the gradient is zero the dispersion compensator 102 will return to its previous level, i.e. prior to its level at Step 2. Likewise, if the gradient is positive, the dispersion compensator 102 is commanded to return to the level of input of corrective or compensating dispersion introduced to the system in Step 1. This is a significant difference between the present invention and the conventional methods used to introduce corrective compensation into an optical system described above. To this end, conventional control techniques in which the controller commands a compensator action that is directly proportional the magnitude of the dispersion are fundamentally flawed. This type of method is only accurate when the dispersion measured by the detector is proportional to the type of dispersion for which the particular compensator being commanded by a controller will be effective (illustratively PMD or CD). As such, the controller will recognize an absolute value of the dispersion regardless of its source. If this value of dispersion is above a certain threshold (for example a zero dispersion threshold) the controller will command the compensator to introduce corrective dispersion into the optical system. However, the case may be that all of the dispersion that the particular compensator can affect has been removed from the system. If this is the case, because the controller is unable to distinguish the source of the dispersion, and because the controller commands the particular compensator to introduce corrective dispersion to the optical system based on the magnitude of the dispersion, dispersion compensation will be added to the system. Unfortunately, in this case the particular compensator is not capable of correcting for this type of dispersion as it is from the other source, and in fact the dispersion compensator may be adding dispersion to the system. This may result in over-correction and, potentially runaway.

In stark contrast, the illustrative embodiments of the present invention are fundamentally different from that of conventional methods because the controller command(s) 108 that will be sent to dispersion compensator 102 are proportional to the gradient of the measured dispersion. As such, if the gradient of the dispersion is zero, regardless of its magnitude, the compensator will not introduce further "corrective" dispersion to the system, as it recognizes that further correction with the particular compensator is not possible since the dispersion in the system is due to another source. As will be described in more detail herein, another compensator would then be implemented to remove the remaining ("baseline") dispersion in the signal. Likewise, if the gradient is increasing as computed in Step 4, the controller 107 will command the dispersion compensator 102 to return to its previous level of compensation, particularly that of Step 1. To this end, if the compensation introduced in Step 2 results in an increase in the dispersion (grad(dispersion) >0), the controller will recognize that this step may be introducing dispersion into the system since the particular dispersion compensator 102 has removed all of the type of dispersion it is able to remove. As such, the controller 107 will instruct the dispersion compensator 102 to return to its earlier level of compensation (Step 1). The process will then continue with Steps 5–9 as shown in FIG. 3, and as described in more detail below relative to FIG. 4(*a*)–4(*d*).

Finally, if the gradient is less than zero, as shown in the logic sequence in FIG. 3, the controller 107 first decides if the size of the corrective step should be changed to foster adaptability of the compensation. As described herein, the adaptability of the method of the exemplary embodiment enables the correction of changes in dispersion of varying magnitudes. Thereafter, the controller 107 instructs the dispersion compensator 102 to introduce corrective dispersion to reduce the dispersion in the input signal (Step 2). Step 2 is carried out because the small step taken to reduce the dispersion was effective, and the dispersion compensator 102 may be effective at reducing the dispersion (i.e. the type of dispersion which the compensator can correct) and further compensation of this type should be added. Again, the steps of the illustrative method are continued as shown in FIG. 3.

To point out some of the characteristics of the illustrative method shown in the flow chart of FIG. 3, it is useful to review the flow chart together with FIGS. 4(*a*)–4(*d*). To this end, the graph of FIG. 4(*a*) shows dispersion 400 present in the system versus time. 401 is a graphical representation of the implementation of the method. It is important to note that 401 is greatly exaggerated, and the compensator under operation of the method will be introducing corrective dispersion on the order of approximately tenths of picoseconds. At point 402, a measurement of the dispersion by the detector 105 is taken. The controller 107 then issues a control signal to take a small step to reduce the dispersion in the system, and at 403, a new measurement of dispersion is taken with the detector 105. The gradient of the dispersion is thereafter computed, per Step 4 of FIG. 3.

Figure 4A:
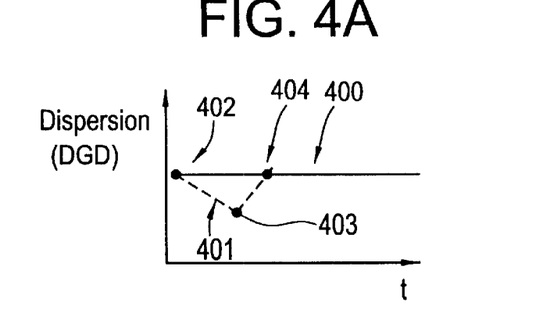
FIGS. 4a–4d are graphical representations illustrating various features of the adaptive feedback control method technique according to an exemplary embodiment of the present invention.
Figure 4B:
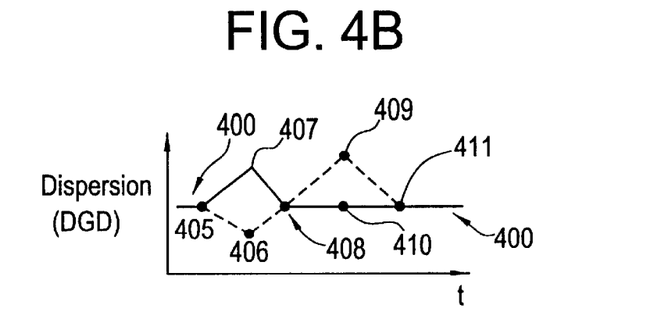

Because the dispersion has not changed in magnitude between Steps 402 and 403 (see graph 400), the dispersion compensator 102 is commanded by the controller 107 to return to its first input level (of Step 1 of FIG. 3) 405. Thus, in the example of FIG. 4(*a*) the gradient of the dispersion is zero. The small step (ending at 403) taken by the dispersion compensator 102 to reduce dispersion, resulted in no change in the dispersion. From the gradient value, the inference is drawn that the dispersion in the system is not due to the type of dispersion which the current dispersion compensator 102 can correct, and the dispersion compensator 102 is instructed via controller command 108 to return to its previous level of input compensation.

Turning now to FIG. 4(*b*), the sequence between 405 and 406 illustrates the case when the gradient is positive. Per Step 1 of FIG. 3, a certain level of dispersion is measured by the detector 105 (shown at 405 in FIG. 4(*b*)). Next, according to Step 2 of FIG. 3, a controller command 108 is issued by the controller 107 to the dispersion compensator 102 to take a small step to decrease the dispersion in the system. This step is shown at 406 in FIG. 4(*b*). As can be seen, at point 407 the magnitude of the dispersion 400 increases, and as such the gradient is positive. At 406, recognizing the gradient of the dispersion is positive, the controller 107 will issue a controller command 108 to the dispersion compensator 102 to return to its previous level (Step 5 of FIG. 3), as seen at 408. According to the sequence between point 405 and 408 (corresponding to Steps 1–5 of FIG. 3), the introduction of corrective compensation between 405 and 406, intended to reduce the dispersion in the system actually results in an increase in the magnitude of the dispersion (positive gradient). As such, the dispersion 400 (baseline dispersion), which is present in the system at point 405, must be from a source of dispersion other than the one for which dispersion 102 can correct, since adding corrective dispersion merely increases the magnitude of the dispersion in the system.

At point 408, Step 6 of the exemplary embodiment of FIG. 3 is initiated, and the dispersion compensator 102 is commanded by the controller 107 to take a small step to increase the dispersion in the system. At 409, another dispersion measurement is taken by the detector 105, and the gradient of the dispersion is computed. The gradient of the dispersion 400 has a zero gradient between points 408 and 409 (see point 410) and the controller issues a command to return to the previous position of compensating input (per Step 9 of the exemplary embodiment of FIG. 3). Upon reaching this level at 411, a measurement is taken of the dispersion 400 (per Step 1) and the exemplary method is repeated continuously.

Turning now to FIG. 4(*c*), another sequence according to an illustrative embodiment of the present disclosure is shown. To this end, according to Step 1 of FIG. 3, the dispersion 400 is measured at point 412. The controller 107 then issues a controller command 108 to the dispersion compensator 102 commanding the dispersion compensator 102 to take a small step to reduce dispersion in the system, with the small step stopping at point 414. At point 414, another measure of the dispersion 400 is taken by the detector 105, and because the magnitude of the dispersion has decreased as shown at point 413, the gradient is less than zero. According to the illustrative embodiment shown in FIG. 3, if the value of the gradient computed per Step 4 is less than zero, a determination is made to see if the step size needs to be changed. As described below, the adaptability is a useful function of the invention of the present disclosure, enabling the compensation to track the time rate of change (the gradient) of the change in the dispersion in the system.

Thereafter, Step 2 of FIG. 3 is repeated, with the dispersion compensator 102 receiving a controller command 108 from the controller instructing it to take yet another small step to reduce dispersion in the system. If, in fact, the determination was made to change the size of the step to, it would be carried out at Step 2 in the reduction of the dispersion in the system. At the end of Step 2, the dispersion compensator 102 reaches the level at point 416, and the measurement of the dispersion is taken. Again, the gradient is calculated per Step 4 of FIG. 3, and, the logic sequence shown in FIG. 3 is carried out.

Figure 4C:
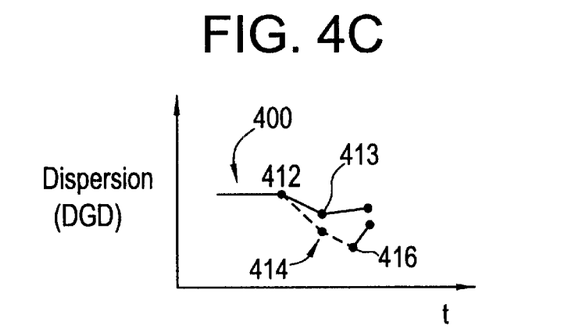

In the particular case shown in FIG. 4*c*, the gradient of the dispersion 400 after point 413 is zero, and, according to the method of the illustrative embodiment of FIG. 3, the controller 107 commands the dispersion compensator 102 to return to its level of compensation at point 414 (see Step 5 of FIG. 3). Thereafter the process continues according to Step 5 of FIG. 3. Again, based on the calculated zero gradient of the dispersion, the exemplary method would result in no further compensation is currently possible with the particular compensator.

Turning now to FIG. 4(*d*), an illustrative sequence according to the exemplary method of FIG. 3 is shown. Initially, the dispersion 400 has a zero gradient at the point shown. At point 415, in accordance with Step 1 of the illustrative method, a measurement is taken of the dispersion in the system is taken by the detector 105. Then, according to Step 2, a controller command 108 from the controller 107 instructs the dispersion compensator 102 to take a small step to reduce the dispersion in the system (terminating at point 416). According to Step 3, a new measurement is taken of the dispersion, in this case at point 417, and according to Step 4, the gradient is computed. In the illustrative embodiment shown in FIG. 4(d), the gradient is greater than zero; and according to the exemplary method in Step 5, the controller 107 issues a controller command 108 signal to the dispersion compensator 102 instructing the dispersion compensator 102 to return to its first level of compensation input of Step 1 (in this case its level at 418). Next, according to Step 6, the control signal from the controller 107 to the dispersion compensator 102 commands the dispersion compensator 102 to take a small step to increase dispersion in the system, shown at 419. The level of dispersion at 420 is measured, and the gradient of the dispersion 400 is calculated. In this particular case the gradient is less than zero, and according to the logical sequence following Step 8, the decision is made to determine if the step size of the compensation should be changed, and the sequence at Step 6 is continued.

Figure 4D:
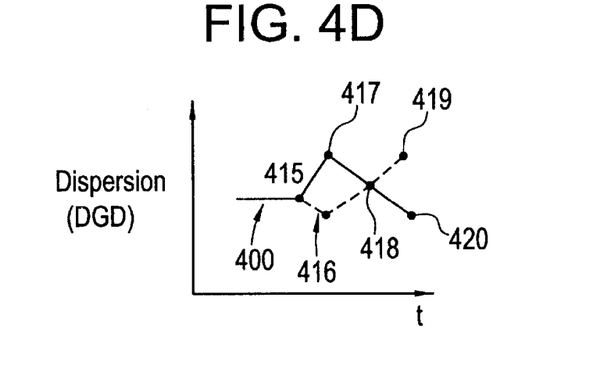

Clearly, according to the illustrative embodiment shown in FIG. 4(d), the change in the level of compensation between points 418 and 419 of the level of compensation introduced into the systems results in a reduction of the dispersion (see point 420) and it is clear that this type of compensation is effective at reducing the type of dispersion present in the system. To wit, the current compensator is effective at removing the type of dispersion which is present in the system, and the method according to the exemplary embodiment of FIG. 3 would continue to move in this direction until no further improvement was possible (i.e. the gradient equals zero).

One particular feature of the illustrative methods of the present invention is adaptability to changes in the dispersion in the system, such as changes in the dispersion due to changes in the dispersion compensation introduced. If the magnitude of the gradient changes, the magnitude of the step changes proportionately. To this end, if at Step 4 or Step 8 of the method of FIG. 3 or Step 3 of FIG. 2 revealed that the gradient of the dispersion had changed, and the gradient of dispersion were negative adaptation, by the controller 107 may be carried out. The adaptation is manifest in a change in the magnitude of the dispersion introduced by the compensator in the proceeding step (the temporal duration of the step remains constant). Illustratively, the controller 107 issues a controller command 108 to the compensator to change the magnitude of the step to be proportional to the gradient just calculated. This adaptive control is particularly useful to correct for sudden changes in the dispersion, particularly of the type that the current compensator can correct.

In addition to the adaptability that automatically occurs by use of the method of the exemplary embodiments of the present invention, it is also of interest to note that if there is a sudden change in the baseline dispersion, the controller 107 will effect an in kind adjustment of the compensation introduced by of the dispersion compensator 102. To this end, in an illustrative example, if the dispersion due to polarization mode dispersion were on the order of 20 picoseconds, the dispersion compensator 102 would introduce polarization mode dispersion having a magnitude of 20 picoseconds, but of opposite phase of the baseline dispersion. If this baseline dispersion dropped to on the order of 10 picoseconds, the control signal from the controller would instruct the dispersion compensator 102 to adjust accordingly to introduce 10 picoseconds of dispersion compensation, again in opposite phase to that of the baseline dispersion of the system. Thereafter, the iterative methods of the illustrative embodiments of the present invention would be repeated continuously to assure dispersion compensation. Finally, the methods according to the illustrative embodiments of the present invention are bounded input-bounded output stable, provided the bandwidth of the controller hardware exceeds that of the dynamics of the signal. This provides for adequate phase margin to compensate for time delays and system latencies. The stability can be seen by noting that the controller commands that will change the amount of dispersion in the signal are given by following equation:

$$Dispersion(t_k) = \begin{cases} Dispersion(t_{k-1}) & \text{if } gradient(t_k) >= 0 \\ Dispersion(t_{k-1}) - step * compensator & \text{if } gradient(t_k) < 0 \end{cases} \quad (3)$$

Because the dispersion will not significantly increase due to actions commanded by the controller (because the method according to the illustrative embodiments of the present disclosure introduce only slight amounts of dispersion through the iteration) the system will be bounded input-bounded output stable.

Figure 5:
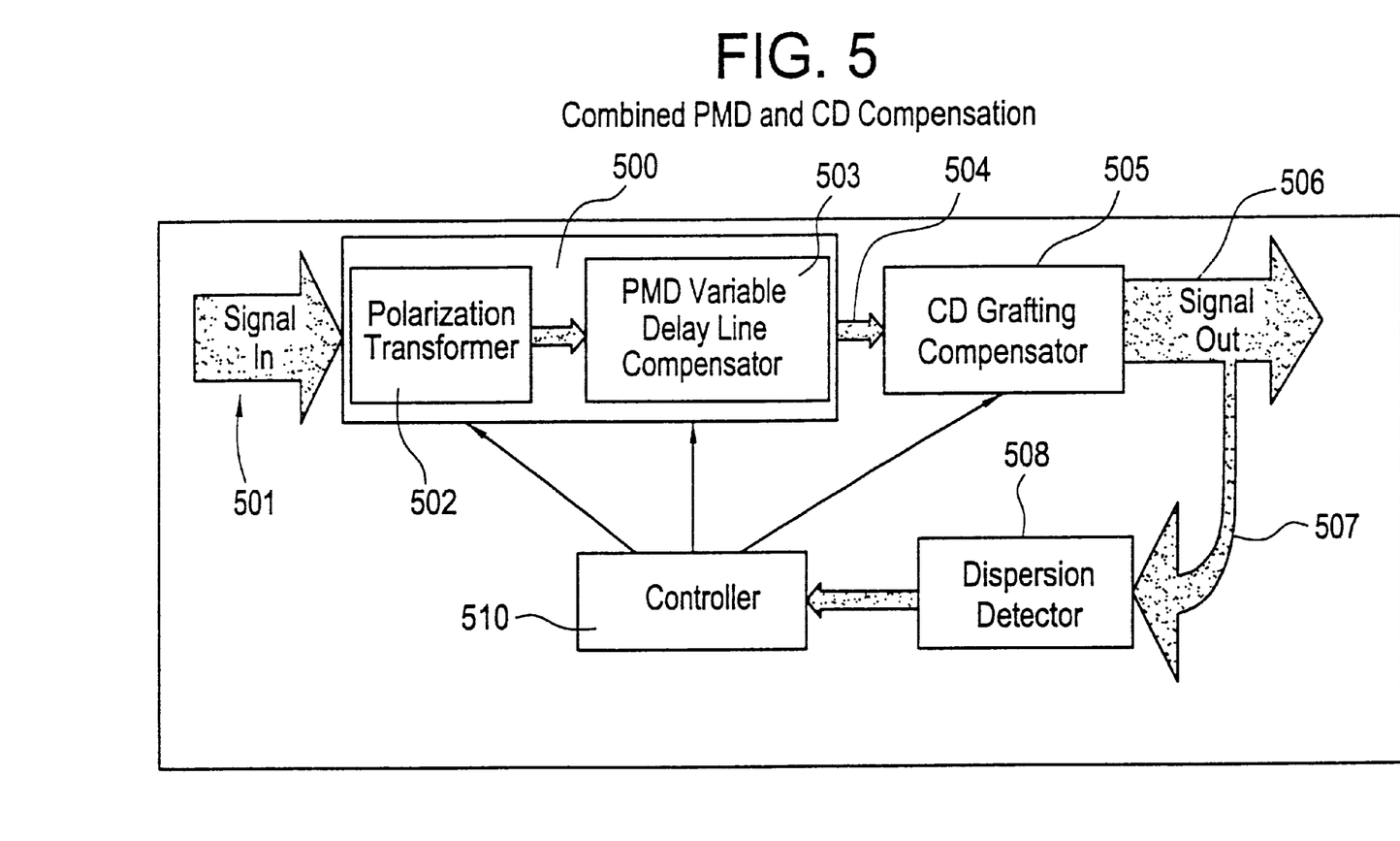
FIG. 5 is a schematic (block diagram) representation of an optical communication system incorporating both PMD and CD compensation according to an exemplary embodiment of the present invention.

Turning now to FIG. 5, another illustrative architecture for implementing the method according to the illustrative embodiments of the present disclosure is shown. Because the invention of the present disclosure issues controller commands to the compensator based on the gradient of the dispersion (i.e., the gradient of the error signals from the dispersion detector), correction for a first type of dispersion can be made, and then sequentially correction for a second type of dispersion can be made. As shown in FIG. 5, a combined polarization mode dispersion and chromatic dispersion compensation architecture is shown. A signal in 501 is input to all fiber PMD compensator 500, which includes a polarization transformer 502 and a PMD variable delay line compensator 503. The output from the PMD variable delay line compensator 504 is input to the chromatic dispersion compensator 505. The signal out is then the compensated output signal. A portion of the signal out 507 is input to a dispersion detector 508 which issues an error signal 509 to the controller 510. According to the exemplary embodiment shown in FIG. 5, the controller 510 will issue control signals to the compensator 500 to effect polarization mode dispersion, illustratively according to one of the methods described in FIGS. 2 and 3. Controller 510 will also issue control commands to the chromatic dispersion compensator 505. Of course, the architecture shown in FIG. 5 is merely illustrative, and variations and modifications thereto are possible. For example, the first compensator in the sequence could be the CD compensator, with the PMD compensator's being sequentially connected thereto. As such, the method of the illustrative embodiment of the present disclosure will be effective if a PMD compensator and a CD compensator are placed in sequentially, and share a single detector that produces a signal that changes monotonically with changes in the dispersion in the system; whether these changes in the dispersion are caused by polarization mode dispersion or by chromatic dispersion.

Many of the various elements shown in FIG. 5 may be found in related and co-pending applications as follows. The polarization mode dispersion compensator 500 may be as described in U.S. patent application Ser. No. 09/589,423, entitled "All Fiber Polarization Mode Dispersion Compensator", referenced above. Accordingly, further details of polarization mode dispersion compensation may be found in this parent application of the present application. Moreover, a polarization mode dispersion compensator of the type described in U.S. patent application Ser. No. 09/785,642 may be used in PMD compensator 500. Further details of these elements may be found in this patent application, the disclosure of which is specifically incorporated by reference as though reproduced in its entirety herein. The chromatic dispersion compensator 505 and the dispersion detector 508 may be of the type described in U.S. patent application Ser. No. 09/784,309, entitled "Electrical Detector For Adaptive Control of Chromatic Dispersion in Optical Systems," filed on even date herewith. Further details may be found in this application, the disclosure of which is specifically incorporated by reference as though reproduced in its entirety herein. The dispersion detector 508 may also be of the type described in the above captioned patent application entitled "All-Fiber PMD Compensator." Finally, the controller 510 may also be of the type described in the above captioned patent applications entitled "Electrical Detector for Adaptive Control of Chromatic Dispersion in Optical Systems" and "All-Fiber PMD Compensator."

The ability of the controller to permit the use of shared architecture for PMD and CD enables the compensation of both types of dispersion in an optical communication system. In addition, the methods according to the illustrative embodiments of the present disclosure permit the control of many actuators with a minimal number of sensors. In the PMD compensator according to the above referenced patent application entitled "All-Fiber PMD Compensator", three sensors are used to independently control eight actuators; three of which are in the polarization transformer; and five of which are in the variable delay line. A single sensor and the controller hardware can control the compensator for chromatic dispersion 505 in FIG. 5.

The invention having been described in detail, it will be readily apparent to one having ordinary skill in the art that the invention may be varied in a variety of ways. Such variations are not to be regarded as a departure from the scope of the invention. All such modifications, as would be apparent to one of ordinary skill in the art having had the benefit of the present disclosure, are intended to be included within the scope of the appended claims.

We claim:

1. A method for controlling dispersion compensation, the method comprising:

a.) receiving a first measurement of dispersion from a detector based on a first input from a dispersion compensator;

b.) commanding said dispersion compensator to take a step to reduce said dispersion;

c.) receiving a second measurement of dispersion from said detector;

d.) calculating a gradient of dispersion between said first measurement of dispersion and said second measurement of dispersion; and e.) sending a command to said dispersion compensator based on a value of said gradient of dispersion.

2. A method as recited in claim 1, wherein if said gradient is less than zero, determining if a size of said step should be changed.

3. A method as recited in claim 2, the method further comprising:

f.) commanding said dispersion compensator to take another step to reduce dispersion;

g.) receiving a third measurement of dispersion from said dispersion detector; and h.) calculating a gradient of dispersion between said second and said third measurement of dispersion.

4. A method as recited in claim 3, wherein if said gradient of dispersion between said second and said third measurement of dispersion is less than zero, determining if a size of said step to reduce dispersion needs to be changed.

5. A method as recited in claim 4, wherein steps (e.)–(h.) are repeated.

6. A method as recited in claim 1, wherein if said gradient of dispersion between said first and said second measurement of dispersion is greater than or equal to zero, commanding said dispersion compensator to return to said first input level.

7. A method as recited in claim 6, wherein the method further comprises:

f.) commanding said compensator to take a step to increase said dispersion;

g.) receiving a third measurement of dispersion; and h.) calculating a gradient of said dispersion between said second and said third measurement of dispersion.

8. A method as recited in claim 7, wherein if said gradient between said second and said third measurement of dispersion is less than zero, determining if a size of said step to increase said dispersion needs to be changed.

9. A method as recited in claim 8, wherein steps (f.)–(h.) are repeated.

10. A method as recited in claim 7, wherein if said gradient of dispersion between said second and said third measurement is greater than or equal to zero, repeating steps (a.)–(e.).

11. A method as recited in claim 1, wherein a.) through e.) are continuously repeated.

* * * * *